(12) United States Patent
Ehbets

(10) Patent No.: US 7,633,051 B2
(45) Date of Patent: Dec. 15, 2009

(54) SPECTRAL PHOTOELECTRIC MEASUREMENT TRANSFORMER

(75) Inventor: Peter Ehbets, Zurich (CH)

(73) Assignee: X-Rite Europe GmbH, Regensdorf (CH)

( * ) Notice: Subject to any disclaimer, the term of this patent is extended or adjusted under 35 U.S.C. 154(b) by 0 days.

(21) Appl. No.: 11/958,608

(22) Filed: Dec. 18, 2007

(65) Prior Publication Data

US 2008/0156969 A1 Jul. 3, 2008

(30) Foreign Application Priority Data

Dec. 28, 2006 (EP) .................. 06126340

(51) Int. Cl.
*G01J 5/30* (2006.01)
(52) U.S. Cl. .............. 250/226; 250/216; 356/328; 356/416
(58) Field of Classification Search .......... 250/226, 250/216, 237 G; 356/326, 328, 416
See application file for complete search history.

(56) References Cited

U.S. PATENT DOCUMENTS

| | | | |
|---|---|---|---|
| 4,081,215 A | 3/1978 | Penney et al. | |
| 5,043,571 A | 8/1991 | Hasegawa | |
| 5,144,498 A | 9/1992 | Vincent | |
| 5,592,294 A | 1/1997 | Ota et al. | |
| 6,008,905 A | 12/1999 | Breton et al. | |
| 6,028,682 A | 2/2000 | Ott et al. | |
| 6,844,931 B2 * | 1/2005 | Ehbets | ............. 356/328 |
| 2003/0169421 A1 | 9/2003 | Ehbets | |
| 2006/0001739 A1 | 1/2006 | Babayoff | |
| 2006/0132777 A1 | 6/2006 | Hubble, III et al. | |
| 2006/0192957 A1 | 8/2006 | Frick et al. | |
| 2006/0192963 A1 | 8/2006 | Frick | |
| 2006/0193512 A1 | 8/2006 | Von Orelli et al. | |

FOREIGN PATENT DOCUMENTS

DE 3041375 6/1985

(Continued)

OTHER PUBLICATIONS

European Search Report dated Feb. 4, 2007.

(Continued)

*Primary Examiner*—Kevin Pyo
(74) *Attorney, Agent, or Firm*—McCarter & English, LLP

(57) ABSTRACT

A spectral photoelectric measurement transformer comprises an array (10) of photoelectric transformer elements and dielectric interference bandpass filters (22a, 22b) disposed on a common filter support (21) connected upstream of them for sensitizing the transformer elements to different wavelength ranges of the measurement light. The bandpass filters are divided into a number of filter groups, each of which contains the same different bandpass filters within the filter group. An optical deflector element (30) spectrally shifts the effective bandpass curves of the bandpass filters of all the filter groups except one so that the effective bandpass curves of all the bandpass filters have different spectral positions. As a result, a multiplication of the filter channels effectively made available can be achieved using only a few different bandpass filters. Due to the small number of different bandpass filters, the measurement transformer is inexpensive to manufacture.

10 Claims, 2 Drawing Sheets

FOREIGN PATENT DOCUMENTS

| | | |
|---|---|---|
| EP | 1185077 | 3/2002 |
| JP | 57166530 | 10/1982 |
| JP | 6235660 | 8/1994 |
| JP | 10160573 | 6/1998 |
| JP | 2001264173 | 9/2001 |
| WO | 2006/045620 | 5/2006 |
| WO | 20068045621 | 5/2006 |

OTHER PUBLICATIONS

European Search Report dated Sep. 7, 2007.
U.S. Appl. No. 11/961,456, entitled "Color Measuring Head And Scanner Device Equipped Therewith" (filed Dec. 20, 2007), Inventor: Peter Ehbets and Adrian Kohlbrenner.
U.S. Appl. No. 11/961,507, entitled "Scanner Device" (filed Dec. 20, 2007), Inventor: Peter Ehbets and Adrian Kohlbrenner.

* cited by examiner

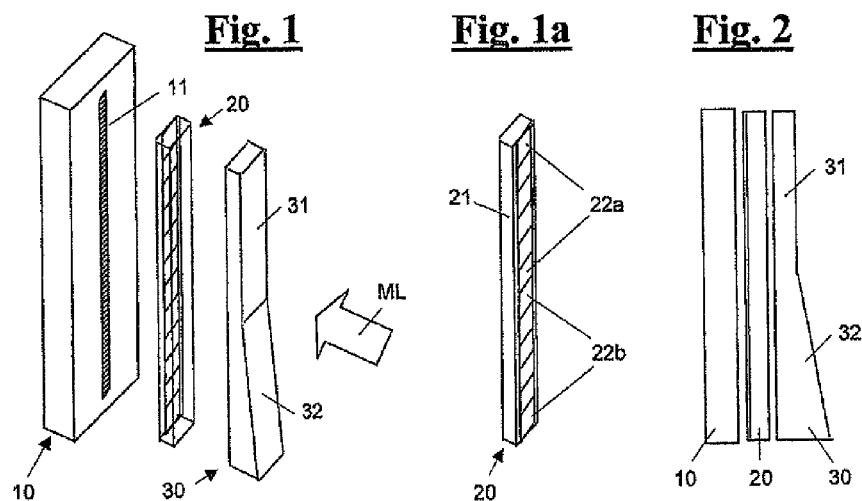
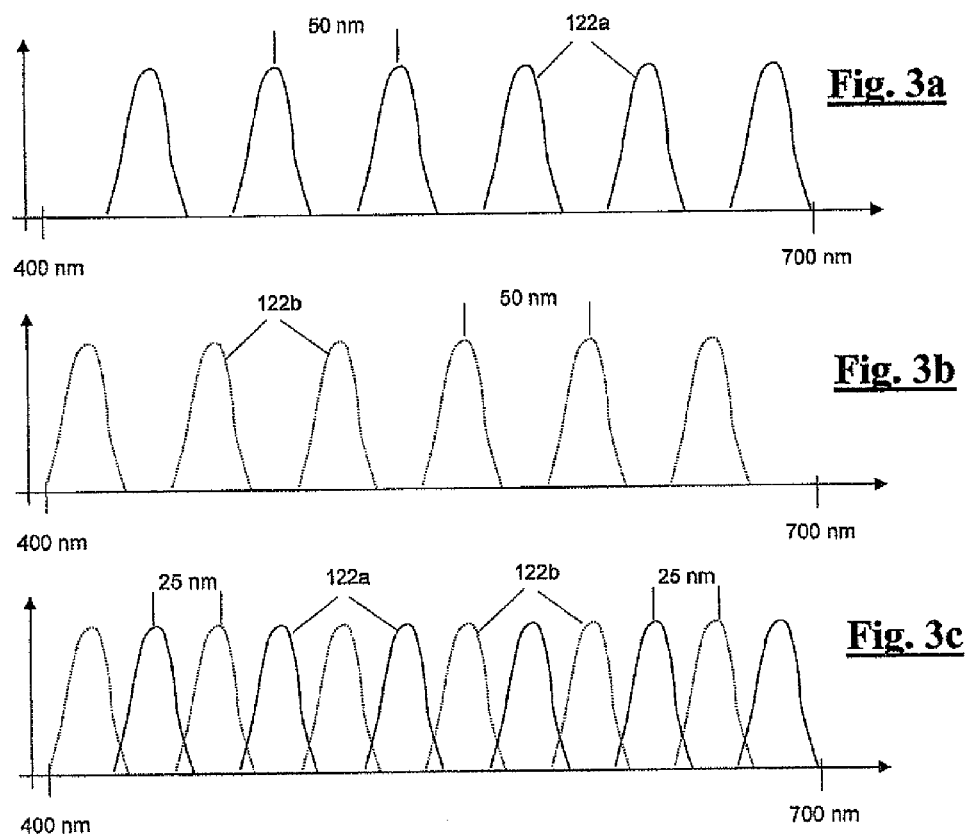

SPECTRAL PHOTOELECTRIC MEASUREMENT TRANSFORMER

BACKGROUND OF THE INVENTION

The invention relates to a spectral photoelectric measurement transformer of the type with an array of photoelectric transformer elements and dielectric interference bandpass filters disposed on a common filter support connected upstream of them for sensitizing the transformer elements to different wavelength ranges of the measurement light.

Known measuring systems equipped with such measurement transformers are the DTP70 systems made by the X-rite company and the SpectroDens systems made by the Techkon company. The measurement transformers of these devices use a matrix arrangement of 4×4 individual photoelectric detectors. A co-operating bandpass filter is positioned in front of each photoelectric detector. The gaps between the filters are filled with black (opaque) compound as a means of providing optical isolation to reduce scattered light.

Spectral measurement transformers of the generic type are of interest in a number of applications. In the field of color measuring technology, for example, they are used as integrated sensors for printers, where they provide an automatic color control system for the printing process.

The general requirements placed on such measurement transformers are that they should be of a compact design and that they should lend themselves to production on a mass scale at a very low manufacturing cost.

Generally speaking, measuring systems equipped with such a measurement transformer must permit a high degree of absolute color measuring accuracy irrespective of the media involved. This measuring requirement corresponds to a spectral resolution of more than 10 different wavelength ranges (filter channels) in the visible measurement range between 420 nm and 680 nm. The filter channels must therefore have a bandpass function with a half-width of 20 to 25 nm and continuously evaluate the visible measurement range without interruptions.

Providing more than 10 measurement channels with appropriate physical bandpass filters drives up the cost of the measuring system.

SUMMARY OF THE INVENTION

An objective of this invention is to improve a spectral measurement transformer of the generic type so that it can be produced relatively inexpensively, even with a high spectral resolution.

This objective is achieved by a spectral photoelectric measurement transformer with an array of photoelectric transformer elements and dielectric interference bandpass filters disposed on a common filter support connected upstream of them for sensitizing the transformer elements to different wavelength ranges of the measurement light, wherein the bandpass filters are divided into a number of filter groups, each of which respectively contains the same different bandpass filters within the filter group, characterized in that optical means are provided which spectrally shift the effective bandpass curves of the bandpass filters of all the filter groups except one so that the effective bandpass curves of all the bandpass filters have different spectral positions.

It is a basic idea underlying the invention to use two or more identical sets of a few different narrow-band filters and effectively obtain twice the number or a multiple of different filter channels using other optical (less expensive) means. This concept proposed by the invention permits more filter channels for a higher measuring accuracy whilst simultaneously reducing costs because the reduction in the number of physical filters simplifies the production process and increases production yield.

BRIEF DESCRIPTION OF THE DRAWINGS

The invention will be described in more detail below with reference to the appended drawings. Of these:

FIG. 1 is an exploded diagram of a first example of an embodiment of the measurement transformer proposed by the invention, FIG. 1a shows a detail from FIG. 1 in a view rotated by 180°, FIG. 2 is a side view of the measurement transformer illustrated in FIG. 1, FIGS. 3a-c illustrates examples of filter spectra.

DESCRIPTION OF PREFERRED EMBODIMENTS

Figure 4:
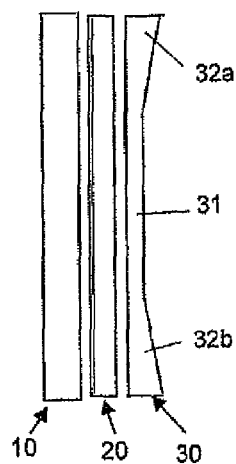
FIGS. 4-6 are views similar to FIG. 2 showing three other examples of embodiments of the measurement transformer proposed by the invention.

The main structure of the measurement transformer proposed by the invention may best be seen from the exploded diagram given in FIG. 1. The measurement transformer comprises a linear array 10 of photoelectric transformer elements which will be referred to below as a detector array, a filter arrangement 20 and an optical deflector element 30. As illustrated in FIG. 2, these three components 10-30 are mounted directly alongside each other or at a slight distance apart from one another and their positions are mutually fixed. The filter arrangement may be glued to the detector array, for example, or may be mounted at a short distance from the active detector surface by mean of spacers.

Measurement light (arrow ML) to be transformed arrives via the deflector element 30 and filter arrangement 20 on the transformer elements of the detector array 10 disposed in the region of a detector window 11 and is transformed by the transformer elements into corresponding electric measurement signals.

The detector array 10 is a standard integrated component of the type made by various manufacturers, such as Taos or Hamamatsu, for example. The electric measurement signals generated by the individual transformer elements of the detector array are read out by a multiplexer integrated in the component and an electronic read-out system likewise integrated in the component and are available for further use at electric terminals, although these are not illustrated.

The filter arrangement 20 comprises a transparent filter support 21, on the detector side of which two groups of, in this case, 6 bandpass filters 22a respectively 22b each are mounted. To provide better clarity in the drawing, the filter arrangement 20 in FIG. 1a is shown rotated by 180 E from the actual mounting position. The bandpass filters within each group differ in terms of their pass band, although the filters within the two groups are identical. Each filter is therefore provided twice. The size of the surface of the common filter support 21 coated with the bandpass filters corresponds to the active surface of the detector array 10.

The bandpass filters 22a respectively 22b are provided in the form of dielectric interference filters and are produced lithographically on the common filter support 21 in a manner known per se by thin film coating technology. This technology or manufacturing method enables 5 to 6 different filter functions (bandpass curves) to be incorporated on a common support at an acceptable cost. A combination with absorbing or reflecting masks enabling cross-talk to be reduced is also possible.

By virtue of one important aspect of the invention, the individual bandpass filters 22a respectively 22b do not cover the complete measurement range (400-700 nm) continuously but are such that their bandpass curves leave a zone without any filter function free between them or on the short wave side respectively, in other words a transmission gap. This is illustrated in FIG. 3a. It shows the nominal bandpass curves denoted by 122a of the six filters 22a respectively the six filters 22b. The bandpass curves lie approximately uniformly distributed across the visible spectral range of 400-700 nm with a mutual distance of approximately 50 nm and a half-width of approximately 20-25 nm each. By nominal bandpass curves are meant those curves which result from a vertical incidence of light (angle of incidence 0 E).

The widths of the zones without any filter function disposed between or on the short-wave side of the bandpass curves 122a (transmission gaps) essentially correspond (in the embodiment illustrated as an example here) to the half-widths of the filter bandpass curves 122a.

Dielectric interference filters exhibit a marked dependency on the angle of incidence of the light. Their bandpass curves respectively their effective mid-wavelengths shift towards shorter wavelengths as the angle of incidence increases (by reference to the normal with respect to the filter plane). This behavior is described by G. Schröder, for example, in Bauelemente der Optik, Taschenbuch der technischen Optik, Hanser Verlag, Chapter 6.11 [Optical components, Handbook of Optical Technology]. FIG. 3b shows the effective bandpass curves denoted by 122b of the six bandpass filters 22a respectively 22b for an angle of incidence of light of approximately 30 E. As may be seen, the bandpass curves 122b lie in the transmission gaps illustrated in FIG. 3a.

The invention specifically makes use of the behavior caused by the angle of incidence in dielectric interference filters and one of the main ideas of the invention is that the measurement light hits the two groups of bandpass filters 22a and 22b at different angles of incidence. The two different angles of incidence are created by the optical deflector element 30, which is mounted at a short distance in front of the filter arrangement 20. This deflector element 30 made from transparent plastic (for reasons of cost) has a plane parallel portion 31 and a prismatic portion 32. The plane parallel portion 31 lies opposite the group of filters 22a and the prismatic portion 32 lies opposite the group of filters 22b. In the plane parallel portion 31, no deflection is imparted to the measurement light and the measurement light therefore arrives at the filters 22a at an angle of incidence of 0 E. The prismatic portion 32 deflects the measurement light on the basis of its prism angle (and its refraction properties) so that the filters 22b are illuminated by a mean angle of incidence which differs correspondingly from 0 E and their effective bandpass curves are shifted in the direction of shorter wavelengths, as illustrated in FIG. 3b. A corresponding measurement of the prism angle gives an angle of incidence which causes a shift of the bandpass curves of the filters 22b towards the centre of the transmission gaps of the filters 22a. From experience, it is known that in order to shift the peak wavelength by 20 nm to 25 nm, a change of angle in the range of from 25 E to 30 E is necessary (see Hecht, "Optics", pages 163 et seq., for example). In the embodiment illustrated as an example, the required shift is approximately 25 nm, which can be achieved by changing the angle of incidence by approximately 30 E. In the case of optical components made from standard plastic materials, a change in prism angle of approximately 40 E is needed in order to obtain this change in the angle of incidence.

FIG. 3c illustrates the effective bandpass curves 122a and 122b of the filters 22a and 22b in combination. As may be seen, by using only six physically different bandpass filters, each of which is duplicated but which are illuminated at different angles of incidence, a spectral resolution of 12 wavelength ranges is obtained.

The filters belonging to one and the same group need not be disposed in a cohesive range and in principle may be randomly distributed across the filter support, the only condition being that the optical deflector element must be adapted accordingly. This is illustrated by the embodiment shown as an example in FIG. 4. In this instance, the filters of one group are disposed in a central zone of the filter support 21, whilst the filters of the other group are distributed on two peripheral zones of the filter support. Accordingly, the optical deflector element 30 has a central plane parallel portion 31 and two outer prismatic portions 32a and 32b with the same prism angle. Conversely, the central portion could also be prismatic, in which case the two outer portions will be plane parallel. By means of an expedient disposition and distribution of the filter groups, the height of the prismatic portions of the deflector element can be kept short.

Figure 5:
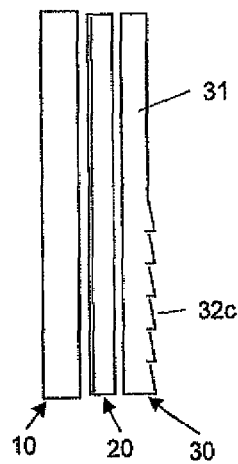

As may be seen from the embodiment illustrated as an example in FIG. 5, the depth of the optical deflector element 30 is also limited due to the fact that its prismatic portion 32c is provided in the form of a Fresnel structure.

The prismatic structure may also be distributed on the two side faces of the optical deflector element.

The underlying principle of the invention based on selectively using the dependence of the interference filters on angle of incidence can be generalized. The bandpass filters may be disposed so that the centre distances of their (nominal) bandpass curves are a whole-number multiple N of the desired spectral resolution of the measurement transformer. By spectral resolution in this context is meant the spectral distance between adjacent filter channels. Each bandpass filter must then be provided precisely N times, in other words the totality of all the bandpass filters on the filter support is sub-divided into N groups, each of which contains the same filters. Accordingly, the optical deflector element is sub-divided into N zones, where each zone is assigned to one of the N filter groups and deflects the measurement light by a different defined angle so that the filters of each group are illuminated with a corresponding different mean angle of incidence. The angles of deflection and the associated angles of incidence are measured so that the effective bandpass curves of the filters illuminated at angles of incidence that are different from 0 E lie more or less equidistantly in the transmission gaps of the filters with an angle of incidence of 0 E.

Put even more generally, the invention is based on the idea of spectrally shifting the effective bandpass curves of the bandpass filters of all the filter groups except one by appropriate optical means (specifically the deflector element 30) so that the effective bandpass curves of all the bandpass filters have different spectral positions (mid-wavelengths or peak wavelengths), thereby multiplying the number of effective filter channels.

Figure 6:
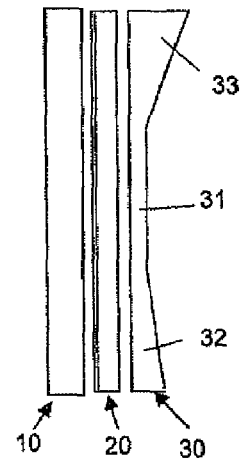
Figure 7:
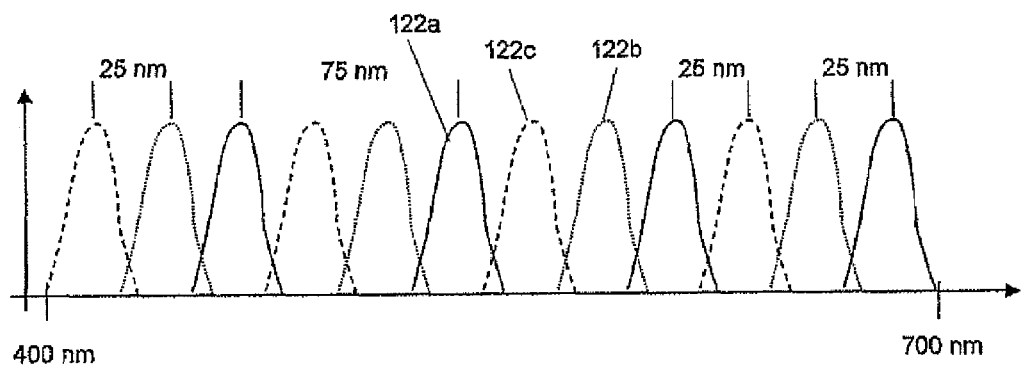
FIG. 7 shows a filter spectrum of the embodiment illustrated as an example in FIG. 6.

FIGS. 6 and 7 illustrate this generalized principle on the basis of an example of an embodiment in which the filter arrangement 20 comprises three groups of four different bandpass filters each disposed at a distance of approximately 75 nm and with half-widths of approximately 25 nm and accordingly, the optical deflector element 30 is provided with three portions 31, 32 and 33, each of which is assigned to one of the three filter groups. Portion 31 is again plane parallel and does not deflect the measurement light. The other two portions 32 and 33 are prismatic with different prism angles and therefore deflect the measurement light by two different angles. The two prism angles and the two resultant angles of deflection of the measurement light are selected so that the effective bandpass curves denoted by 122*b* in FIG. 7 of the bandpass filters co-operating with the portion 32 are shifted by approximately 25 nm and the effective bandpass curves denoted by 122*c* of the bandpass filters co-operating with the portion 33 are shifted by approximately 50 nm and therefore come to lie equidistantly in the transmission gaps of the bandpass curves denoted by 122*a* of the bandpass filters co-operating with the portion 31 of the deflector element 30.

In the embodiments of examples described above, a linear detector array 10 is used in each case. However, it goes without saying that a two-dimensional detector array could also be used, in which case the disposition of the bandpass filters and the portions of the optical deflector element must be selected accordingly in two dimensions.

Interference filters have the property that polarization dependencies can not occur unless the incidence of light is perpendicular. These can be reduced by opting for an appropriately adapted filter design. On the basis of another aspect of the invention, however, the effects of polarization are reduced due to the fact that the deflector element is provided with two prismatic portions for each angle of deflection, which respectively deflect the measurement light by the same angle but in two orthogonal spatial directions with respect to one another. This being the case, the filter arrangement 20 comprises two groups per angle of incidence, each with the same bandpass filters. The filters of the two groups are respectively assigned to one of the two prismatic portions. For the filters with an angle of incidence that is not 0 E, this results in two respective filter channels which are spectrally identical but spatially orthogonal. By summing the signals respectively of the orthogonal filter channels, the polarization dependency is reduced. In order to compensate for the different coefficients of efficiency of the orthogonal filter channels, the summation may be conducted with an appropriate weighting.

Figure 8:
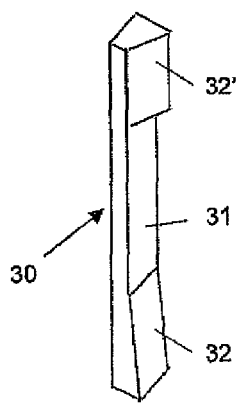
FIG. 8 is a perspective view showing a detail of another example of an embodiment of the measurement transformer proposed by the invention.

Based on the above, FIG. 8 illustrates a deflector element 30 comprising three portions of identical length. The middle portion 31 is plane parallel and the two outer prismatic portions 32 and 32' have a prismatic shape. The prism angles of the two portions 32 and 32' are identical but are mutually offset by 90 E from the optical axis (normal onto the middle portion 31), in other words orthogonal.

This present patent application is based on European Patent Application No. 06 126 340.6, filed on Dec. 18, 2006, with the European Patent Office, the contents and disclosure of which is hereby incorporated by reference herein in its entirety.

The invention claimed is:

1. Spectral photoelectric measurement transformer, comprising:
    a) an array of photoelectric transformer elements;
    b) a plurality of dielectric interference bandpass filters disposed on a common filter support and connected upstream from the array of photoelectric transformer elements and sensitizing the transformer elements to different wavelength ranges of the measurement light,
    wherein the plurality of bandpass filters are divided into a plurality of identical filter groups, each identical filter group including an identical plurality of different bandpass filters; and
    c) an optical deflector element connected upstream of the bandpass filters, the optical deflector element having a number of portions corresponding to the number of filter groups,
    wherein each portion of the deflector element corresponds to a different filter group,
    wherein each portion of the deflector element deflects a distinct beam of measurement light at an angle of deflection different than any other beam of measurement light for any other portion of the deflector element, such that (i) said distinct beam of measurement light is applied to the filter group corresponding to said portion of the deflector element at an angle of incidence corresponding to said angle of deflection, and (ii) the effective bandpass curves of the bandpass filters of at least all but one of the filter groups is shifted so that the effective bandpass curves of all the bandpass filters have different spectral positions,
    wherein the half-widths and spectral distances of the bandpass curves of the bandpass filters of each filter group are disposed so that transmission gaps are left free between the bandpass curves, and
    wherein the widths of the transmission gaps essentially correspond to a multiple of the sought spectral resolution corresponding to the number of filter groups.

2. Spectral photoelectric measurement transformer according to claim 1, wherein the angles of deflection of the deflector element are selected so that the effective bandpass curves of the band pass filters of at least all but one of the filter groups are shifted essentially equidistantly into the transmission gaps.

3. Spectral photoelectric measurement transformer according to claim 1, wherein the optical deflector element is disposed directly on or at a short distance from the filter support.

4. Spectral photoelectric measurement transformer according to claim 1, wherein the optical deflector element has a plane parallel portion and at least one prismatic portion or an appropriate prismatic Fresnel structure.

5. Spectral photoelectric measurement transformer according to claim 4, wherein the optical deflector element has two prismatic portions which deflect the measurement light by the same angle in two spatial directions orthogonal to one another.

6. Spectral photoelectric measurement transformer according to claim 1, wherein the optical deflector element is made from optical transparent plastic.

7. Spectral photoelectric measurement transformer according to claim 1, wherein the dielectric interference bandpass filters are lithographically applied to the filter support using thin film coating technology.

8. Spectral photoelectric measurement transformer, comprising:
    a) an array of photoelectric transformer elements;
    b) a plurality of dielectric interference bandpass filters disposed on a common filter support and connected upstream from the array of photoelectric transformer elements and sensitizing the transformer elements to different wavelength ranges of the measurement light,
    wherein the plurality of bandpass filters are divided into a plurality of identical filter groups, each identical filter group including an identical plurality of different bandpass filters; and c) an optical deflector element connected upstream of the bandpass filters, the optical deflector element having a number of portions corresponding to the number of filter groups, wherein each portion of the deflector element corresponds to a different filter group, and wherein each portion of the deflector element deflects a distinct beam of measurement light at an angle of deflection different than any other beam of measurement light for any other portion of the deflector element, such that (i) said distinct beam of measurement light is applied to the filter group corresponding to said portion of the deflector element at an angle of incidence corresponding to said angle of deflection, and (ii) the effective bandpass curves of the bandpass filters of at least all but one of the filter groups is shifted so that the effective bandpass curves of all the bandpass filters have different spectral positions.

9. Spectral photoelectric measurement transformer, comprising:

a) an array of photoelectric transformer elements;

b) a plurality dielectric interference bandpass filters disposed on a common filter support and connected upstream from the array of photoelectric transformer elements and sensitizing the transformer elements to different wavelength ranges of the measurement light;

wherein the plurality of bandpass filters includes a plurality of filter groups of one or more bandpass filters each; and c) an optical deflector element connected upstream of the bandpass filters, the optical deflector element having a number of portions corresponding to the number of filter groups, wherein each portion of the deflector element corresponds to a different filter group, and wherein each portion of the deflector element deflects a distinct beam of measurement light at an angle of deflection different than any other beam of measurement light for any other portion of the deflector element, such that (i) said distinct beam of measurement light is applied to the filter group corresponding to said portion of the deflector element at an angle of incidence corresponding to said angle of deflection, and (ii) the effective bandpass curves of the bandpass filters of at least all but one of the filter groups is shifted so that the effective bandpass curves of all the bandpass filters have different spectral positions.

10. Spectral photoelectric measurement transformer, comprising:

a) an array of photoelectric transformer elements;

b) a plurality of dielectric interference bandpass filters disposed on a common filter support and connected upstream from the array of photoelectric transformer elements and sensitizing the transformer elements to different wavelength ranges of the measurement light, wherein the plurality of bandpass filters are divided into a plurality of identical filter groups, each identical filter group including an identical plurality of different bandpass filters; and c) an optical deflector element connected upstream of the bandpass filters, whereby, the effective bandpass curves of the bandpass filters of at least all but one of the filter groups is shifted so that the effective bandpass curves of all the bandpass filters have different spectral positions, said optical deflector element having a number of portions corresponding to the number of filter groups, wherein each portion of the deflector element corresponds to a different filter group, and wherein the optical deflector element has a plane parallel portion and at least one prismatic portion or an appropriate prismatic Fresnel structure.

* * * * *